Sept. 19, 1967 C. B. WOLF ETAL 3,343,019
HIGH TEMPERATURE GAS ARC HEATER WITH LIQUID
COOLED ELECTRODES AND LIQUID COOLED
CHAMBER WALLS
Filed March 6, 1964
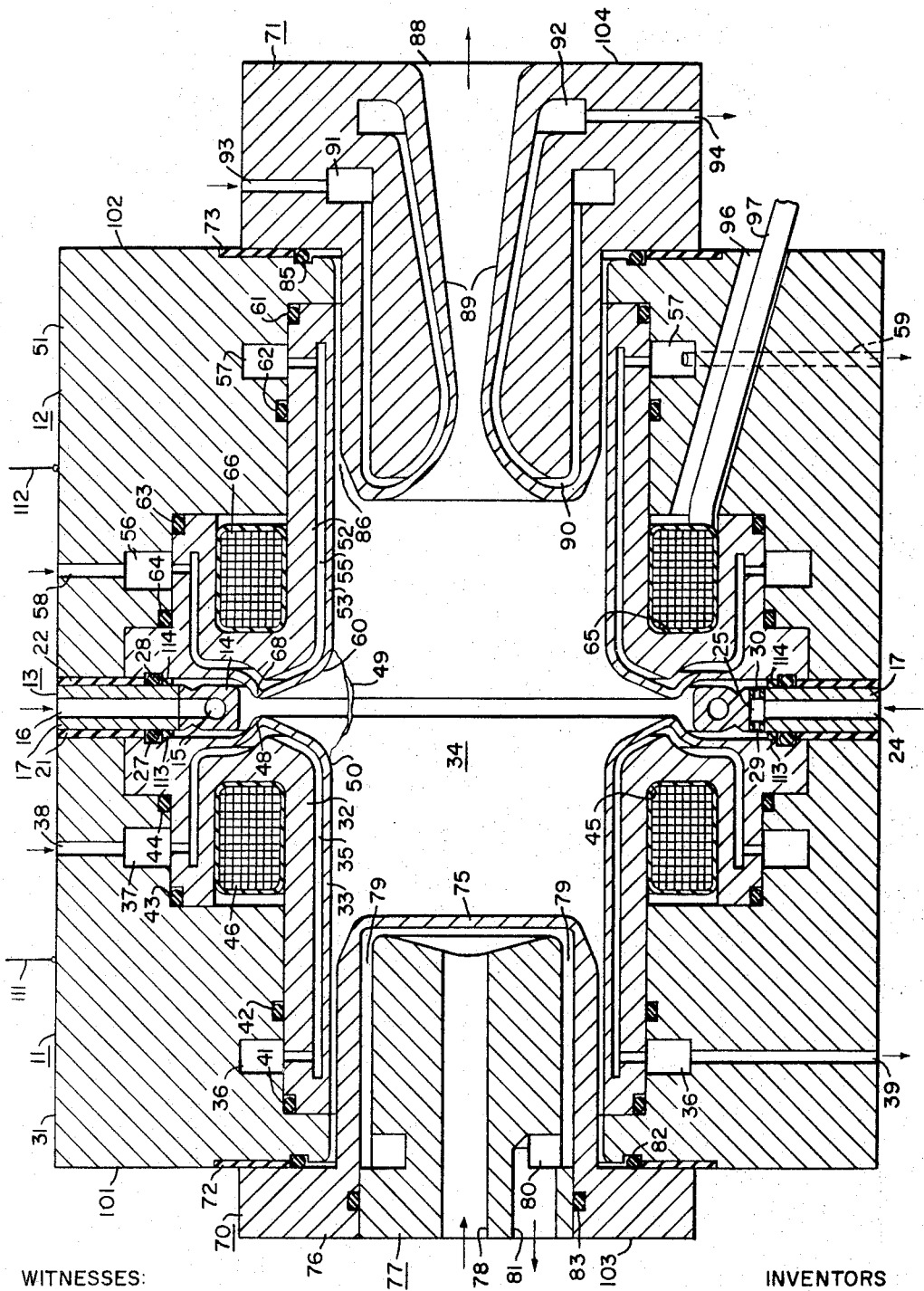
WITNESSES:
Bernard R. Gieguy
James F. Young
INVENTORS
Charles B. Wolf and
George A. Kemeny.
BY Maury I. Hull
ATTORNEY

United States Patent Office 3,343,019
Patented Sept. 19, 1967

3,343,019
HIGH TEMPERATURE GAS ARC HEATER WITH LIQUID COOLED ELECTRODES AND LIQUID COOLED CHAMBER WALLS
Charles B. Wolf, Irwin, and George A. Kemeny, Export, Pa., assignors to Westinghouse Electric Corporation, East Pittsburgh, Pa., a corporation of Pennsylvania
Filed Mar. 6, 1964, Ser. No. 349,896
19 Claims. (Cl. 313—32)

This invention relates to improvements in gas arc heaters, and more particularly to a gas arc heater utilizing the arc chamber walls as the electrode surfaces.

In arc heaters in which a steady flow of gas is heated by an electric arc to increase the enthalpy of the gas, it is necessary in high power devices to prevent localized overheating and concomitant metal evaporation from the electrodes.

Some expedients which have proved to some degree successful have been water cooling of the electrodes, and rapid moving of the arc over the electrode surface, such as that which is achieved by means of interaction of the arc with a magnetic flux field, to prevent the metal evaporation which would occur with stationary arc contact locations.

In addition, it is usually desirable and frequently necessary to provide that all parts of the arc heater chamber which are exposed to direct radiation from the arc and the hot gases are cooled, to allow for operation for extended periods. Insulators and sealing O-rings in particular have to be optically baffled, or otherwise protected so that they do not receive direct radiation from the arc and the incandescent gases. Furthermore, the various components of an electric arc heater must be so located and electrically insulated from each other as to cause the arc to be maintained between electrodes and the gas to be effectively heated by this arc. The arc must not be allowed to jump to undesired arc paths, and preferably the gas enters at a position, or at an angle, so that it is effectively heated and mixed to provide for uniform gas temperature.

Apparatus embodying our invention accomplishes all of these desirable and necessary objectives in apparatus suitable for direct current, or single phase alternating current, operation, and particularly well suited for high temperature operation. In summary, our invention includes, but is not limited to, an arc chamber or arc heater in which the electrodes or arc contact areas are formed by the cylindrical walls of the pressure vessel. This allows the use of larger arc contact areas than could be obtained by other designs. Cold gas admitted between electrodes moves the arc toward the center of the arc chamber. The cylindrical electrodes may be separated by a water cooled ring or heat shield, and as in conventional practice, the nozzle may be water cooled, and the means for plugging up the other end of the arc chamber may be water cooled and have its own cooling manifold.

A primary object of the invention is to provide a new and improved arc heater utilizing the cylindrical walls of the arc chamber as electrodes.

A further object of the invention is to provide a new and improved gas arc heater especially suitable for heating gases to extremely high temperatures.

Another object is to provide a new and improved arc chamber having improved optical baffling of insulating and sealing parts.

These and other objects will become more clearly apparent after a study of the following specification, when taken in connection with the accompanying drawing, in which the single figure thereof is an arc heater constructed according to our invention.

Referring now to the drawing for a more detailed understanding of the invention, there is shown generally designated 11 and 12 two cylindrical sections of arc heater chamber forming apparatus separated by a disc-like heat shield generally designated 13. The disc-like heat shield may be composed, generally speaking, of two sections composed of different materials. The inner ring portion 14 may be composed of copper and have an annular passage 15 therearound for the passage of a cooling fluid, for example water, the passage 15 being connected with inlet and outlet means, one of these, for example inlet means 16, being shown. The outer portion of the heat shield 13 may be composed of other material which serves as a manifold and as one of the enclosing members of the arc heater cavity. The sides of the heat shield 13 are insulated from the adjacent cylindrical sections 11 and 12 by insulating discs 21 and 22 respectively.

The section through the lower portion of the ring 17 shows a radial inlet 24 for gas admission, the heat shield 13 having a transverse aperture or slot 25 therein making connection with the inlet 24 to provide two or more gas inlets for the heat shield. Aperture 25 forms a manifold with separate small holes 29 and 30 so as to effect near uniform air admission into the arc heater cavity. Holes 29 and 30 are positioned at spaced intervals along the air header 25 so that gas to be heated is uniformly admitted at a plurality of points around the peripheries of annular ridges 48 and 68. It will be understood that since inlet and outlet radial conduits are provided for water passage 15, that two air headers, each substantially semicircular, are provided.

It will be understood that whereas a minimum of two radially extending conduits 16 are needed for cooling passage 15, and a minimum of two air headers are thus necessitated, a number of gas inlets may be provided at spaced peripheral intervals around the heat shield, and likewise more than one water inlet and more than one water outlet may be provided for the coolant flow passage 15.

The insulating discs 21 and 22 terminate at their inner edges in a pair of O-ring seals 27 and 28 respectively. These O-rings may be further protected from radiation by insulating rings 113 and 114 which may be of ceramic material or other insulation.

The section of the chamber wall generally designated 11 is seen to comprise, generally speaking, two portions, an outer portion 31 which may be of, for example, steel and may be ferromagnetic material, and an inner portion 32 of, for example, copper. The copper portion 32 is seen to have a thin wall portion 33 adjacent the arc chamber 34, and it is seen that directly behind the thin wall portion 33 is a cylindrical passage 35 shaped generally to the contour of the wall of portion 32. The passage 35 which as before mentioned may be cylindrical in shape and extend around the entire circumference of the wall portion, is provided for the flow of cooling water which may enter the annular or ring shaped water passage 37 by way of inlet conduit 38 and exit from the annular or ring shaped water passage 36 by way of exit conduit 39. The outer chamber wall portion 31 is shown to have sealing means such as O-rings at 41, 42, 43 and 44 for providing seals between the outer section 31 and the inner section 32. Disposed in an annular recess 45 in portion 32 is a field coil 46 provided for purposes to be made hereinafter more clearly apparent. It is seen that the outer wall contour of wall portion 33 comes to a peak 48 overhanging the air space which separates the heat shield 13 from the cylindrical portion 11 on that side thereof. This peak 48 is provided to insure optical baffling for the insulating member 113, and O-ring 27 so that direct radiation from the arc 49 in the arc chamber 34, and direct radiation from heated gas in the vicinity of the arc 49, does not fall upon the insulating member 113 or O-ring 27. Wall surface 50 is rounded and conforms very closely to the path of the magnetic flux in this area.

Oppositely disposed with respect to the cylindrical wall section 11 is the aforementioned cylindrical wall section 12, which may be substantially identical with the section 11 but with ends reversed to provide the symmetrical arrangement shown. Section 12 has an outer portion 51 and an inner portion 52 with a thin wall portion 53. Adjacent the wall portion 53 is a cylindrical cooling passage 55, having an inlet at 56 connected to inlet conduit 58 and an outlet at 57 connected to outlet conduit 59. Sealing O-rings 61, 62, 63 and 64 are provided, and a field coil 66 is provided as shown in recess 65. The wall portion 53 also has a peak portion 68 for providing optical baffling for the insulating member 114 or O-ring 28. Wall surface 60 is curved to the curvature of the magnetic field from coil 66.

The field coils 46 and 66 may be so excited that their fields oppose each other, with the result that the magnetic lines of force are substantially perpendicular to the arc direction of the arc shown at 49.

Coils 46 and 66 are energized by direct current, and produce a magnetic field which causes the arc to move continuously around the chamber walls.

As previously stated, the cylindrical wall sections generally designated 11 and 12 constitute parts of an electrical circuit, and the thin wall portions 33 and 53 of these sections constitute the electrodes between which the arc 49 occurs. Accordingly, sections 11 and 12 are insulated from each other by the aforementioned insulating discs 21 and 22. Likewise, section 11 is insulated by insulating gasket 72 from a chamber plug generally designated 70 which is utilized to enclose one end of the arc chamber 34, and section 12 is also insulated from a nozzle generally designated 71 at the other end of the arc chamber by insulating gasket 73.

The plug 70 is seen to consist of a heat transferring cylindrical portion 75 with a flange 76, this portion 75 being composed of, for example, copper. The inside end of the portion 75 is seen to be relatively thin but yet thick enough to withstand the pressure generated in the arc chamber without being bent towards the left against the remainder of the plug. The outer portion of the plug is generally designated 77, and is cylindrical in shape, with a central bore 78. Water or other cooling fluid may be admitted through the bore 78, flowing around the annular or cylindrical passage 79 and out of the water header 80 and outlet passage 81. A sealing ring 82 is provided as shown, as is the sealing ring 83, both in annular grooves. It is seen that the sealing ring 82 is optically baffled so that it receives no direct radiation from the arc 49 in the chamber 34. If desired, cold gas may be admitted in the annular gap between members 75 and 33 to further provide electrical insulation between members 11 and 70 and to prevent deposition of contaminants in the annular gap and on O-ring 82, any suitable means, not shown for convenience of illustration being provided for this purpose.

The nozzle generally designated 71 is insulated as aforementioned from the adjacent chamber wall section 12 by the insulating disc 73 having the O-ring seal 85. The O-ring 85 is optically baffled so that it does not receive direct radiation from the arc 49 in the chamber 34. It is seen that a small space 86 exists between the adjacent wall of the nozzle 71 and the inner wall portion 53 of the cylindrical section 12 to provide the aforementioned necessary electrical insulation. If desired, cold gas may be admitted into annular gap 86 to further provide electrical insulation and prevent deposition of contaminants in gap 86 and on O-ring 85, any suitable means, not shown for convenience of illustration, being provided for this purpose. Nozzle 71 has a vent or exhaust passage 88 and has thin wall portion 89 adjacent the exhaust or vent 88 to provide for maximum cooling. Behind the wall portion 89, which is substantially conical in shape, is a passage 90 for the flow of cooling fluid such as water, water being admitted to header 91 by inlet conduit 93 and exhausted from outlet conduit 94 by way of water header 92.

It is seen that the chamber section 12 has at any suitable point therein a channel or passageway 96 through which electrical connections 97 are made to the field coil 66. An additional passageway, not shown, similar to the passageway 96 is provided in chamber section 11 for bringing leads separately to the field coil 46.

Clamping means, not shown for simplicity of illustration, is provided for applying clamping forces which will tightly hold the sections 11 and 12 against the insulating discs 21 and 22 and firmly hold the heat shield 13 in place against the large pressures created in the arc chamber, while maintaining electrical insulation between sections 11 and 12. In addition, means, not shown for convenience of illustration, is provided for clamping the chamber plug generally designated 70 and the nozzle generally designated 71 to the assembly, while maintaining plug 77 electrically insulated from section 11, and maintaining nozzle 71 electrically insulated from wall section 12. Both of the aforementioned clamping means may consist of a pair of ring members or ring means, insulated if desired, disposed at each end of the arc chamber apparatus, having a plurality of peripherally spaced holes through which bolts, insulated if desired, pass, which extend the length of the arc chamber and are firmly secured by nuts at the opposite ends, the rings firmly pressing against surfaces 101 and 102, and against the outer surface 103 of plug 70 and the end surface 104 of nozzle 71. Plug 70 may also be secured to wall portion 11 by suitable insulated bolts and nozzle 71 may be similarly attached to chamber section 12 through a separate set of bolts.

In the operation of the apparatus, prior to the admission of gas, the plug generally designated 70 may be removed after the clamping pressures thereon are released, and the arc chamber inspected and a shooting wire introduced between the wall portions 33 and 53 for starting the arc when a potential is applied to the electrodes. The plug is thereafter secured in place. Electrical connections to sections 11 and 12 are provided at 111 and 112, but other suitable electrical connections could be provided if desired. Thereafter, gas is admitted through the inlets 24 and a potential applied to input leads 111 and 112 to generate a potential across electrode surfaces 33 and 53. The arc is started simultaneously therewith or shortly after the magnetic field is set up by energizing coils 46 and 66. The gas admitted at 24 moves the arc toward the center of the arc chamber. As previously stated, gas admission may be tangential to enhance mixing and arc movement.

The plug and the nozzle both have what in effect are coolant manifolds.

As previously stated, it will be understood that the bolts and clamps utilized to clamp the assembly together may be themselves insulated to provide the necessary insulation between portions of the arc chamber structure.

The invention provides arc heating apparatus distinguished by a number of features. The electrodes form the cylindrical side walls of the arc heater cavity, and give the desired maximum arc contact areas. The two electrodes are of identical construction, which reduces manufacturing costs. Sealing design at the plug and nozzle ends are also identical. The plug and nozzle can be moved to lengthen or shorten the arc heater cavity. If desired, a number of interchangeable plugs and a number of interchangeable nozzles of different lengths may be provided or insulating spacers 72 and 73 of different thickness may be provided which will of course require a change in sealing means 82 and 85. It is noted that the field coils are located close to the arc, which means that strong fields can be produced with smaller field coil power expenditure. Part of the electrode back-up structure can be ferromagnetic, which aids in concentrating the flux field, and further reduces field coil power expenditure for a given flux density. The configuration involves a minimum of parts and is designed to lessen any chance of stray arcing to plug, nozzle or heat shield.

Typical operating conditions for arc heating apparatus constructed according to the embodiment of the invention are as follows:

| | |
|---|---:|
| Hot gas temperature, ° R. | 15,700 |
| Diameter of hot gas sphere, inches | 3 |
| Air flow, lbs. per sec. | 0.18 |
| Pressure in cavity, p.s.i.a. | 500 |
| Radiation loss from gas, kilowatts | 1000 |
| Arc contact losses, kilowatts | 400 |
| Current, amperes | 10,000 |
| Voltage, volts | 400 |
| Radiated heat flux at electrodes (estimated), kilowatts per square inch | 35 |
| Total heat flux to be removed from arc contact area (estimated), kilowatts per square inch | 70 |

The apparatus is readily adaptable to single phase alternating current, or to direct current operation. The arc length may be varied within limits by making the ring member 13 thicker or thinner as desired or by adding additional rings similar to 13 between members 11 and 12. It has been found that the arc heater of our invention may be designed much smaller than a comparable heater utilizing conventional electrodes.

A further advantage offered by the embodiment illustrated should be noted. As will be readily understood, the magnetic lines of force of the electromagnet are roughly circular about the field coil, assuming uniform permeability. The field coils are so located in the electrode structure that the center of the coil cross section is roughly located at the virtual center of the arc of a circle describing the electrode surface area (at any cross section plane). Since the field flux direction is roughly circular about the field coil as aforementioned, this assures that the flux lines will be near parallel to the arcing surface of the electrode, which is desired to obtain rapid arc movement over the electrode surface area.

Furthermore, the apparatus illustrated permits the field coils to be located very close to the arc, with the result that smaller coils may be utilized to provide the necessary field strength between electrodes.

Whereas we have described wall portions 31 and 51 as being composed of conductive material, it should be understood that so long as a potential is brought to wall portions 32 and 52, the outer shells could be composed of non-conductive material. The term "insulating" when used herein without a modifier means electrically insulating.

Whereas coolant passages 79, 35, 55 and 90 have been described as essentially annular or cylindrical passages it should be understood that these passages could consist of separate, closely spaced tubular passages with ribs in between as may be required for strength considerations, the passages communicating at both ends with the water headers.

Whereas we have shown and described our invention with respect to an embodiment thereof which gives satisfactory results, it should be understood that changes may be made and equivalents substituted without departing from the spirit and scope of the invention.

We claim as our invention:

1. Arc heater apparatus comprising, in combination, means forming an arc chamber, the chamber forming means including a first generally cylindrical wall portion and a second generally cylindrical wall portion, the first and second wall portions being of similar inner diameters and axially aligned, means between the first and second wall portions axially spacing and electrically insulating the wall portions from each other, the first and second wall portions being symmetrical at the adjacent ends thereof, the first and second wall portions being composed at least partially of conductive material, nozzle means disposed at one end of the chamber, means closing the other end of the chamber, means for admitting gas to be heated to the chamber through the space between the first and second wall portions, means for applying an electrical potential across the two cylindrical wall portions to form an arc inside the chamber between the two cylindrical wall portions, and means for setting up a magnetic field in the chamber in predetermined direction with respect to the arc.

2. Arc heater apparatus according to claim 1 wherein the inner surfaces of the wall portions at the adjoining ends thereof are additionally characterized as being partially rounded to form surfaces which are substantially quarti-circular in cross section.

3. Arc heater apparatus according to claim 1 wherein the inner surfaces of the wall portions at the adjoining ends thereof are additionally characterized as having partially rounded portions to form surfaces which are substantially quarti-circular in cross section, each of the cylindrical wall portions having an annular recess therein near the inner end thereof, and the means for setting up a magnetic field is additionally characterized as including first and second coils disposed respectively in the recesses in the first and second cylindrical wall portions, the virtual centers of the partially rounded portions of the inner surfaces of the cylindrical wall portions substantially coinciding with the magnetic axes of the coils in the respective cylindrical wall portions whereby the curvature of the magnetic field at the rounded wall portion has substantially the same contour as that of the rounded wall portion.

4. Arc heater apparatus according to claim 1 wherein the first cylindrical wall portion, the second cylindrical wall portion, the closing means, and the nozzle means are all further characterized as having passageways therethrough near the inner surfaces thereof for the flow of a cooling fluid.

5. In arc heater apparatus, in combination, means forming an arc chamber having a wall including two generally cylindrical wall portions composed at least partially of conductive material, means for spacing and electrically insulating one portion of the wall of the arc chamber from the other portion of the wall of the arc chamber, the adjacent ends of the one wall portion and the other wall portion being symmetrical with respect to each other, means for bringing electrical potential to the said one portion and said other portion and causing an electric arc to take place between the two portions inside the chamber, closure means, nozzle means connected to the chamber, and means for admitting gas to be heated to the chamber through the space between wall portions.

6. Arc heater apparatus according to claim 5 wherein the means for spacing the cylindrical wall portions from each other includes an annular ring disposed between the wall portions, insulating gaskets on both sides of the annular ring and electrically insulating the ring from the adjacent cylindrical wall portions, and wherein each of the cylindrical wall portions is additionally characterized as having an annular ridge portion overhanging the adjacent insulating gasket and providing an optical baffler to prevent direct radiation from the arc and hot gases in the chamber from impinging upon the insulating gasket.

7. Apparatus according to claim 5 including in addition means for setting up a magnetic field in the chamber in predetermined position with respect to the arc.

8. Apparatus according to claim 5 in which the two wall portions are additionally characterized as having passageways therein near the inside surfaces thereof for the flow of a cooling fluid therearound, and including in addition means for conducting a cooling fluid to the passageways in the two wall portions, and means for conducting fluid from the passageways in the two wall portions.

9. Apparatus according to claim 5 wherein the spacing and insulating means between the cylindrical wall portions is additionally characterized as having an annular passageway therein and as having inlet and outlet means connected to the annular passageway for bringing a cooling fluid to the passageway and conducting fluid from the passageway.

10. Apparatus according to claim 5 wherein the two wall portions are additionally characterized as each having an inner lining composed of a heat conductive material having a passageway therein near the inner surface thereof, and including in addition means for conducting a cooling fluid to the passageway and conducting fluid from the passageway.

11. Arc heater apparatus comprising, in combination, chamber forming means including first and second spaced axially aligned generally cylindrical wall portions, annular means disposed between the first and second cylindrical wall portions for conducting a gas to be heated to the interior of the chamber, means electrically insulating the annular means from the wall portions on each side thereof, means for applying an electrical potential between the first and second cylindrical wall portions to cause an arc inside the chamber between the first and second wall portions, means for setting up a magnetic field of predetermined strength and direction with respect to the arc inside the chamber, plug means in one end of the chamber and sealing said one end of the chamber and nozzle means located in the other end of the chamber for exhausting gas from the chamber after being heated by the arc.

12. Arc heater apparatus comprising, in combination, means forming an arc chamber, the means forming an arc chamber including first and second generally cylindrical wall portions, an annular ring disposed between the first and second wall portions and insulated from both the first and second wall portions, the annular ring having an inner portion composed of a highly heat conductive material, the inner portion having an annular passageway therein, the ring having fluid inlet and fluid outlet conduits communicating with the annular passageway for bringing a cooling fluid to the annular passageway and exiting fluid therefrom, the ring having in addition passageways extending thereinto for admitting gas to be heated into the chamber formed by the first and second cylindrical wall portions, coil means adjacent the first wall portion for setting up a magnetic field when energized, other coil means adjacent the second wall portion for setting up a magnetic field when energized, the coil means and other coil means being energized to produce a field of predetermined direction and intensity in the chamber, the first cylindrical wall portion having a first coolant passageway therein near the inner surface thereof, means for bringing a cooling fluid to the first coolant passageway and conducting fluid therefrom, the second cylindrical wall portion having a second coolant passageway therein near the inner wall thereof, means for bringing a cooling fluid to the second coolant passageway and conducting fluid therefrom, means adapted to be cooled by circulating fluid closing one end of the chamber formed by the cylindrical wall portions, means for applying a potential between the first and second wall portions to produce an arc in the chamber, and nozzle means adapted to be cooled by cooling fluid disposed in the other end of the chamber, gases admitted to the chamber after being heated by the arc therein being exhausted through said nozzle means.

13. Arc heater apparatus comprising, in combination, the chamber forming means forming an arc chamber, the chamber forming means including first and second generally cylindrical wall portions separated from each other, the first wall portion having a lining on the inside thereof over substantially the entire length, the lining being composed of a material having a high heat conductivity, the lining having a first coolant passageway therein, means for bringing a cooling fluid to the first coolant passageway and conducting fluid therefrom, first field coil means located in the first cylindrical wall portion at the end thereof adjacent the second cylindrical wall portion, means for bringing an energizing potential to the first field coil means, the second cylindrical wall portion having an inner lining over substantially its entire length composed of a highly heat conductive material, a second coolant passageway in the inner lining of the second cylindrical wall portion, means for conducting fluid to and conducting fluid from the second coolant passageway, second field coil means located in the second cylindrical wall portion at the end thereof adjacent the first cylindrical wall portion, means for energizing the second field coil means, a spacer member disposed between the first and second cylindrical wall portions and insulated from both the first and second cylindrical wall portions, the spacer member having generally the same external shape as the wall portions, the spacer member having a passageway therein extending therearound near the inner surface thereof, means for bringing fluid to and conducting fluid from the passageway in the spacer member, additional conduit means in the spacer member communicating between the inside of the chamber and the exterior of the chamber for bringing a gas to be heated into the chamber, means for closing the outer end of the first cylindrical wall portion, nozzle means located in the outer end of the second cylindrical wall portion, and means connected to the first and second wall portions for bringing an energizing potential thereto and forming an electric arc inside the chamber between the lining of the first cylindrical wall portion and the lining of the second cylindrical wall portion, said arc heating gas admitted to the chamber, the heated gases being exhausted through the nozzle means.

14. Arc heater apparatus comprising, in combination, a first generally cylindrical member composed of conductive material, the first cylindrical member having a first portion of enlarged inner diameter and a second portion of enlarged inner diameter, the inner diameter of the second portion being greater than the inner diameter of the first portion, first means for producing a magnetic field disposed in the second portion, first lining means composed of a highly heat conductive material disposed at least in the first portion, the first lining means being of a thickness to render the inner diameter of the first cylindrical member substantially uniform, the first lining means having an annular passageway therearound, water inlet means connected to the annular passageway and water outlet means connected to the annular passageway, means adapted to be water cooled for plugging up one end of the first cylindrical member, a second generally cylindrical member composed of conductive material of the same outer diameter as the first cylindrical member, the second cylindrical member having a first portion of enlarged inner diameter and a second portion of enlarged inner diameter, the inner diameter of the last named second portion being greater than the inner diameter of the last named first portion, second means for producing a magnetic field disposed in the second portion of the second cylindrical member, second lining means disposed at least in the first portion of the second cylindrical member, the second lining means being of a thickness sufficient to render the inner diameter of the second cylindrical member substantially uniform, the second lining means having an annular passageway therein, means for bringing a cooling fluid to the last-named annular passageway and conducting fluid from the last-named annular passageway, the other end of the first cylindrical member being adjacent and axially aligned with one end of the second cylindrical member, insulating means separating the first cylindrical member from the second cylindrical member, means for bringing an electrical potential to the first and second cylindrical members and forming an arc between the inner wall of the first cylindrical member and the inner wall of the second cylindrical member, means for applying an energizing potential to the first and second magnetic field producing means for producing a field in the chamber of predetermined amplitude and direction with respect to the arc, and nozzle means located in the outer end of the second cylindrical member, the insulating means between the first and second cylindrical members being constructed and arranged to provide a gas passageway for conducting gas to be heated into the arc chamber, the gas after being heated being exhausted from the nozzle means.

15. Arc heater apparatus comprising, in combination, chamber forming means including a wall portion, the wall portion being composed of two similar sections electrically insulated from each other, means for bringing an electrical potential to said two wall sections to produce an electric arc therebetween inside the chamber, means for admitting gas to be heated to the chamber between the two sections, nozzle means for exhausting heated gas from the chamber, the two wall sections having similar annular recesses therein near the inner ends thereof, two coils disposed in the annular recesses respectively, and means for energizing the coils and setting up a magnetic field in the chamber.

16. Apparatus according to claim 15 wherein the means for admitting gas to be heated to the chamber includes means between the wall sections for conducting gas to be heated into the chamber at a plurality of peripherally spaced points between wall sections.

17. Apparatus according to claim 15 wherein the two wall sections are additionally characterized as including passageways therein near the inside wall of the chamber, and including in addition means for conducting a cooling fluid to the passageways and means for conducting the fluid from the passageways.

18. Arc heater apparatus comprising, in combination, chamber forming means, said chamber forming means including a wall portion consisting of only two generally cylindrical sections composed of conductive material, spacer means between the sections including a spacer member separated from the sections by gaskets composed of electrically insulating material, means connected to the wall sections for bringing an energizing potential thereto and producing an arc therebetween inside the chamber, means for admitting gas to be heated to the chamber through the space between the two generally cylindrical sections, nozzle means for exhausting gas from the chamber, and means disposed in predetermined position with respect to the chamber for setting up a magnetic field therein.

19. Arc heater apparatus according to claim 18 wherein the spacer member is additionally characterized as having at least one passageway therein.

References Cited
UNITED STATES PATENTS

| | | | |
|---|---|---|---|
| 3,048,736 | 8/1962 | Emmerich | 313—231 X |
| 3,140,421 | 7/1964 | Spongberg | 315—111 |

JAMES W. LAWRENCE, *Primary Examiner.*

C. R. CAMPBELL, *Assistant Examiner.*